United States Patent
You et al.

(10) Patent No.: US 10,660,081 B2
(45) Date of Patent: May 19, 2020

(54) DOWNLINK SIGNAL RECEPTION METHOD AND USER EQUIPMENT, AND DOWNLINK SIGNAL TRANSMISSION METHOD AND BASE STATION

(71) Applicant: LG ELECTRONICS INC., Seoul (KR)

(72) Inventors: Hyangsun You, Seoul (KR); Eunsun Kim, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/306,507

(22) PCT Filed: Jun. 1, 2017

(86) PCT No.: PCT/KR2017/005752
§ 371 (c)(1),
(2) Date: Nov. 30, 2018

(87) PCT Pub. No.: WO2017/209547
PCT Pub. Date: Dec. 7, 2017

(65) Prior Publication Data
US 2019/0297601 A1    Sep. 26, 2019

Related U.S. Application Data

(60) Provisional application No. 62/344,366, filed on Jun. 1, 2016.

(51) Int. Cl.
*H04W 4/00* (2018.01)
*H04W 72/04* (2009.01)
(Continued)

(52) U.S. Cl.
CPC ............ *H04W 72/042* (2013.01); *H04L 5/00* (2013.01); *H04L 5/0082* (2013.01);
(Continued)

(58) Field of Classification Search
CPC ... H04L 27/2602; H04L 27/2605; H04L 5/00; H04L 5/0007; H04L 5/001; H04L 5/0048;
(Continued)

(56) References Cited

U.S. PATENT DOCUMENTS 9,252,918 B2 *  2/2016  Nory ..................... H04L 1/0045
2011/0274031 A1 * 11/2011 Gaal ..................... H04L 5/0051
                                                                 370/315
(Continued)

OTHER PUBLICATIONS

PCT International Application No. PCT/KR2017/005752, Written Opinion of the International Searching Authority dated Oct. 17, 2017, 18 pages.
(Continued)

*Primary Examiner* — Minh Trang T Nguyen
(74) *Attorney, Agent, or Firm* — Lee, Hong, Degerman, Kang & Waimey

(57) ABSTRACT

A user equipment attempts to decode decoding candidates and detects a physical downlink control channel (PDCCH) within time symbols from time symbol #0 to time symbol # N−1 for downlink control channel transmission in a transmission time interval (TTI). The user equipment receives downlink data on the basis of downlink control information carried by the PDCCH. Each of time symbol #0 to time symbol # N−1 includes a floor(X/N) number of decoding candidates. N is a maximum number of time symbols available for downlink control channel transmission in the TTI and is equal to or smaller than N, and X is a maximum number of decoding candidates for each TTI.

20 Claims, 10 Drawing Sheets

(51) Int. Cl.
*H04L 5/00* (2006.01)
*H04L 27/26* (2006.01)

(52) U.S. Cl.
CPC ..... *H04L 27/2605* (2013.01); *H04W 72/0446* (2013.01); *H04L 5/0007* (2013.01)

(58) Field of Classification Search
CPC ..... H04L 5/005; H04L 5/0051; H04L 5/0053; H04L 5/0082; H04W 72/042; H04W 72/0446
See application file for complete search history.

(56) References Cited

U.S. PATENT DOCUMENTS

| | | | |
|---|---|---|---|
| 2013/0100921 A1* | 4/2013 | Nakao | H04L 5/001 370/329 |
| 2013/0223402 A1 | 8/2013 | Feng et al. | |
| 2014/0146799 A1 | 5/2014 | Park et al. | |

OTHER PUBLICATIONS

ZTE, et al., "Discussion on sPDCCH for shortened TTI", 3GPP TSG RAN WG1 Meeting #85, R1-164639, May 2016, 9 pages.
Interdigital, "Consideration on sPDCCH Design", 3GPP TSG RAN WG1 Meeting #85, R1-165049, May 2016, 4 pages.
LG Electronics, "Discussion on DCI and sPDCCH for latency reduction", 3GPP TSG RAN WG1 Meeting #85, R1-164542, May 2016, 6 pages.

* cited by examiner (a)

(b)

(c)

(d)

(e)

(f)

DOWNLINK SIGNAL RECEPTION METHOD AND USER EQUIPMENT, AND DOWNLINK SIGNAL TRANSMISSION METHOD AND BASE STATION

CROSS-REFERENCE TO RELATED APPLICATIONS

This application is the National Stage filing under 35 U.S.C. 371 of International Application No. PCT/KR2017/005752, filed on Jun. 1, 2017, which claims the benefit of U.S. Provisional Application Nos. 62/344,366 filed on Jun. 1, 2016, the contents of which are all hereby incorporated by reference herein in their entirety.

TECHNICAL FIELD

The present invention relates to a wireless communication system, and more particularly, to methods and devices for transmitting/receiving downlink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of receiving a downlink signal by a user equipment. The method comprises: detecting a physical downlink control channel (PDCCH) by attempting to decode decoding candidates within time symbols from time symbol #0 to time symbol # N−1 for DL control channel transmission in a time transmission interval (TTI); and receiving DL data based on DL control information carried by the PDCCH. Each of the time symbols #0 to # N−1 includes floor(X/N) decoding candidates, where N is a maximum number of symbols available for DL control channel transmission in the TTI and X is a maximum number of decoding candidates for each TTI.

In another aspect of the present invention, provided herein is a user equipment for receiving a downlink signal. The user equipment includes a radio frequency (RF) unit, and a processor configured to control the RF unit. The processor detects a physical downlink control channel (PDCCH) by attempting to decode decoding candidates within time symbols from time symbol #0 to time symbol # N−1 for DL control channel transmission in a time transmission interval (TTI); and controls the RF unit to receive DL data based on DL control information carried by the PDCCH. Each of the time symbols #0 to # N−1 includes floor(X/N) decoding candidates, where N is a maximum number of symbols available for DL control channel transmission in the TTI and X is a maximum number of decoding candidates for each TTI.

In a further aspect of the present invention, provided herein is a method of transmitting a downlink signal by a base station to a user equipment. The method comprises: transmitting a physical downlink control channel (PDCCH) in one of decoding candidates included within time symbols from time symbol #0 to time symbol # N−1 for DL control channel transmission in a time transmission interval (TTI); and transmitting DL data based on DL control information carried by the PDCCH. Each of the time symbols #0 to # N−1 includes floor(X/N) decoding candidates, where N is a maximum number of symbols available for DL control channel transmission in the TTI and X is a maximum number of decoding candidates for each TTI In a still further aspect of the present invention, provided herein is a base station for transmitting a downlink signal to a user equipment. The base station includes a radio frequency (RF) unit, and a processor configured to control the RF unit. The processor controls the RF unit to transmit a physical downlink control channel (PDCCH) in one of decoding candidates included within time symbols from time symbol #0 to time symbol # N−1 for DL control channel transmission in a time transmission interval (TTI); and controls the RF unit to transmit DL data based on DL control information carried by the PDCCH. Each of the time symbols #0 to # N−1 includes floor(X/N) decoding candidates, where N is a maximum number of symbols available for DL control channel transmission in the TTI and X is a maximum number of decoding candidates for each TTI.

In each aspect of the present invention, the DL control information may include information on a size from a time symbol in which the PDCCH is detected to a time symbol in which DL data transmission is started.

In each aspect of the present invention, information on N may be transmitted to the user equipment.

In each aspect of the present invention, N may differ according to subframe type.

In each aspect of the present invention, the PDCCH may be detected or transmitted in time symbol # N'−1 at the latest, where N is an actual number of time symbols used for DL control channel transmission in the TTI and is smaller than or equal to N.

In each aspect of the present invention, a physical control format indicator channel (PCFICH) including information on N may be transmitted to the user equipment. The PCFICH may be transmitted using one or more resource element groups (REGs) or one or more control channel elements (CCEs).

In each aspect of the present invention, the DL data may be transmitted or received in a plurality of TTIs. The number of symbols available for DL control channel transmission in each of the plural TTIs may be 0.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR INVENTION

Figure 1:
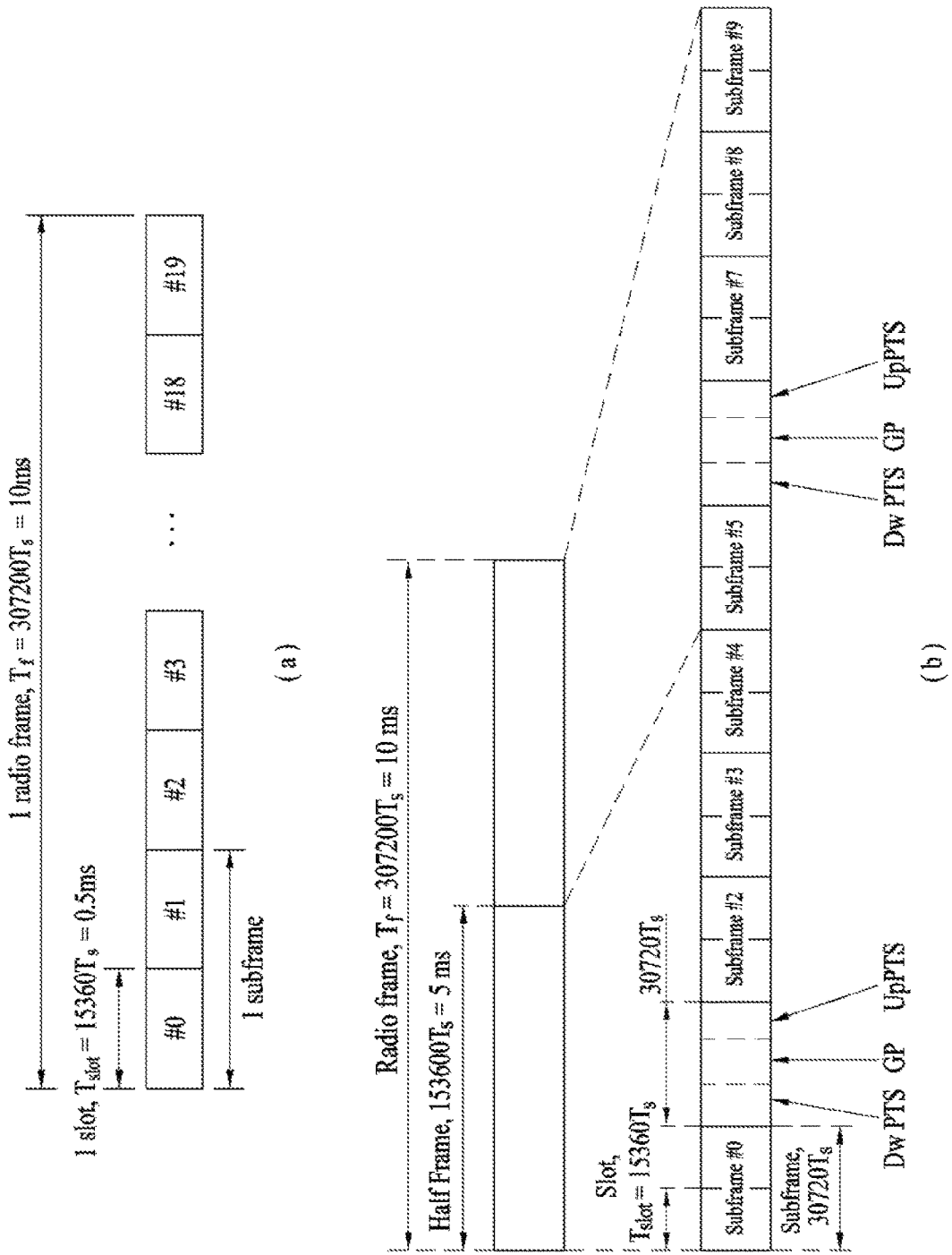
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
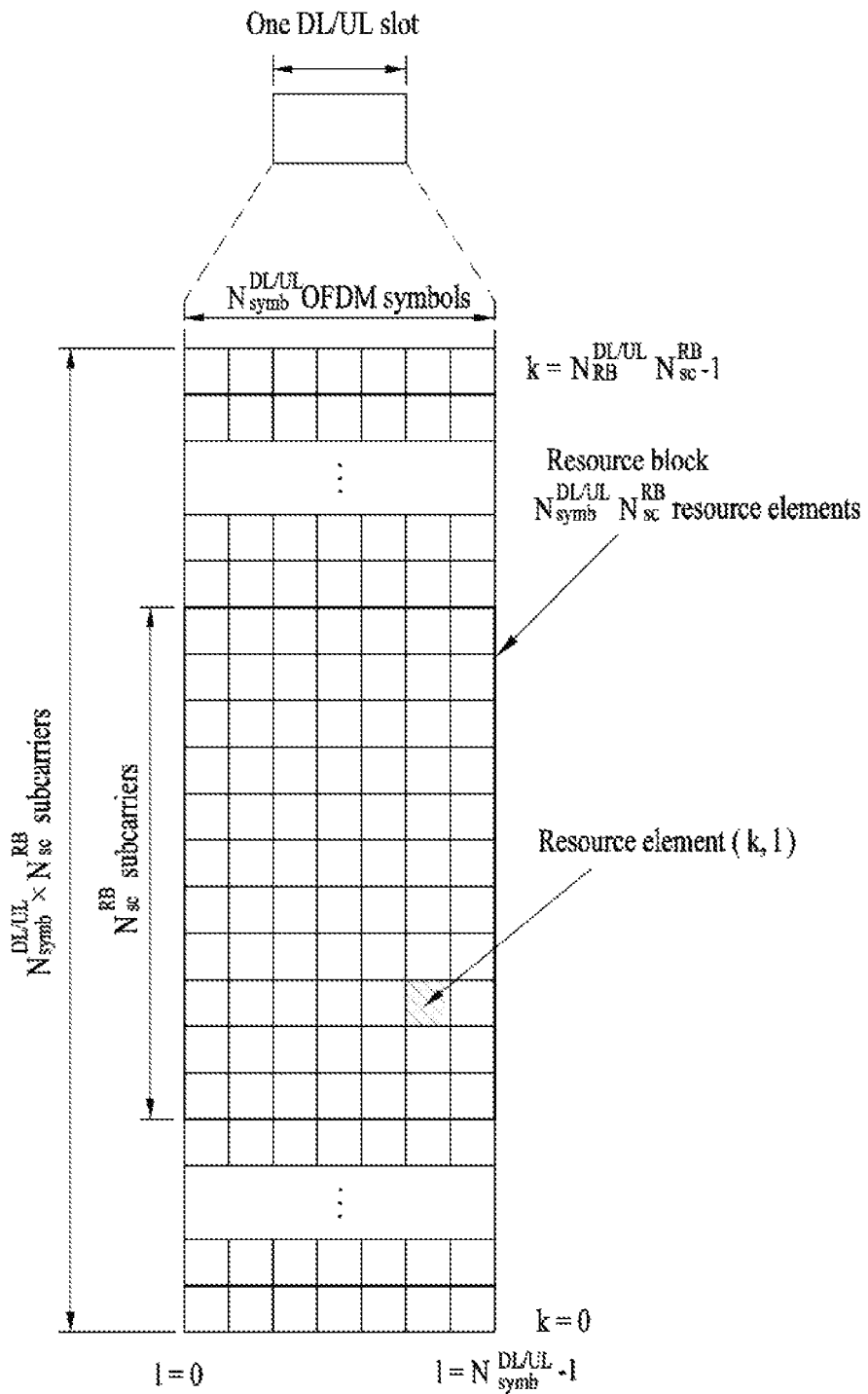
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
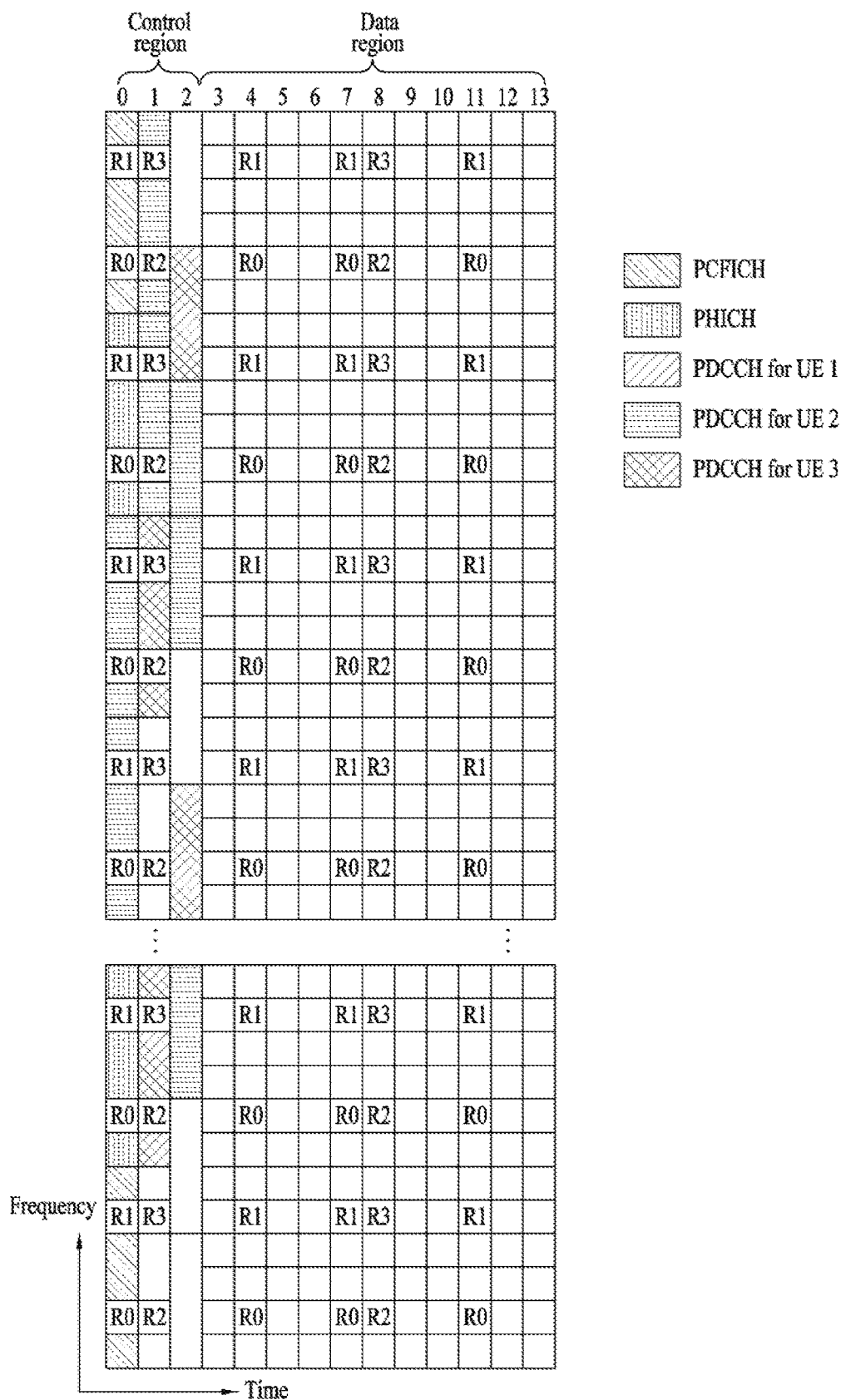
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted in a control region. A UE may monitor the plural PDCCHs. An eNB determines a DCI format according to DCI which is to be transmitted to the UE and attaches a cyclic redundancy check (CRC) to the DCI. The CRC is masked (or scrambled) with an identifier (e.g. a radio network temporary identifier (RNTI)) according to an owner or a usage of a PDCCH. For example, if the PDCCH is dedicated to a specific UE, the CRC may be masked with an identifier (e.g. a cell-RNTI (C-RNTI)) of the UE. If the PDCCH is used for a paging message, the CRC may be masked with a paging identifier (e.g. a paging-RNTI (P-RNTI)). If the PDCCH is used for system information (more specifically, a system information block (SIB)), the CRC may be masked with a system information RNTI (SI-RNTI). If the PDCCH is used for a random access response, the CRC may be masked with a random access-RNTI (RA-RNTI). CRC masking (or scrambling) includes, for example, XOR operation between the CRC and the RNTI at a bit level.

Generally, a DCI format, which may be transmitted to the UE, may differ according to a transmission mode (TM) configured for the UE. In other words, for the UE configured with a specific TM, only certain DCI format(s) corresponding to the specific TM rather than all DCI formats may be used.

A PDCCH is allocated to first m OFDM symbol(s) in a subframe, where m is an integer equal to or greater than 1 and is indicated by a PCFICH.

The PCFICH carries information about the number of OFDM symbols that DCI carried by the PDCCH spans. The PCFICH is transmitted on the first OFDM symbol of a subframe and carries information about the number of OFDM symbols used for transmission of control channels in the subframe. The PCFICH informs the UE of the number of OFDM symbols used in a corresponding subframe in every subframe. The PCFICH is located on the first OFDM symbol. The PCFICH is configured by 4 resource element groups (REGs) and each REG is distributed in the control region based on a cell ID. One REG consists of 4 REs.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system may be numbered from 0 to $N_{CCE}-1$, wherein $N_{CCE}$=floor($N_{REG}$/9) and $N_{REG}$ denotes the number of REGs which are not allocated to a PCFICH or a PHICH. A PDCCH consisting of n consecutive CCEs may start only on a CCE fulfilling "i mod n=0", wherein i denotes a CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows aggregation levels that define search spaces and the number of PDCCH candidates at each aggregation level in an LTE/LTE-A system. A PDCCH candidate is also referred to as a PDCCH decoding candidate or a decoding candidate. DCI formats that the UE should monitor depend on a TM configured in each serving cell.

TABLE 1

| Type | Search space $S^{(L)}_k$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

The number of PDCCH candidates corresponds to the maximum number of blind detections that the UE can perform. For example, referring to Table 1, the UE may attempt to perform a maximum of 6 blind detections in a USS at aggregation level 1. Since the UE cannot infinitely perform blind decoding/blind detection (BD) in a subframe, the number of BDs that the UE can perform in each subframe is defined. Referring to Table 1, the number of PDCCH candidates that the UE should monitor in UE-specific search spaces (USSs) including PDCCH candidates to carry UE-specific DCI is 6 for AL=1, 6 for AL=2, 2 for AL=4, and 2 for AL=8, thus 16 in total, and the number of PDCCH candidates that the UE should monitor in common search spaces (CSSs) including PDCCH candidates to carry common DCI is 4 for AL=4 and 2 for AL=8, thus 6 in total. According to the legacy LTE/LTE-A standard, in consideration of a PDCCH decoded by a CRC scrambled with a C-RNTI, a semi-persistent scheduling (SPS)C-RNTI, a temporary C-RNTI, an SI-RNTI, a P-RNTI, and/or an RA-RNTI (see 3GPP TS 36.213), a maximum of 44 decoding/detection attempts per subframe may be performed.

Figure 4:
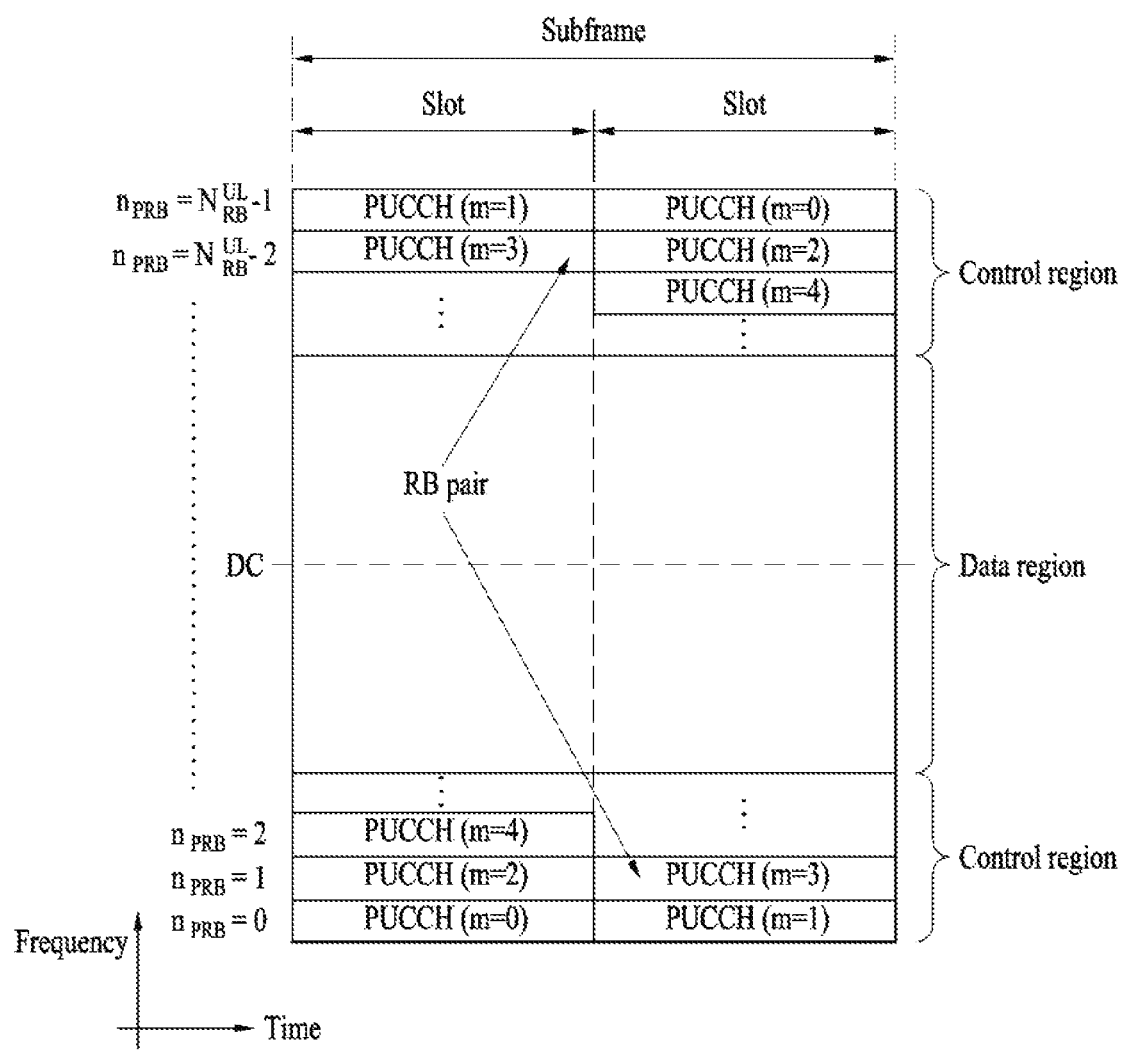
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
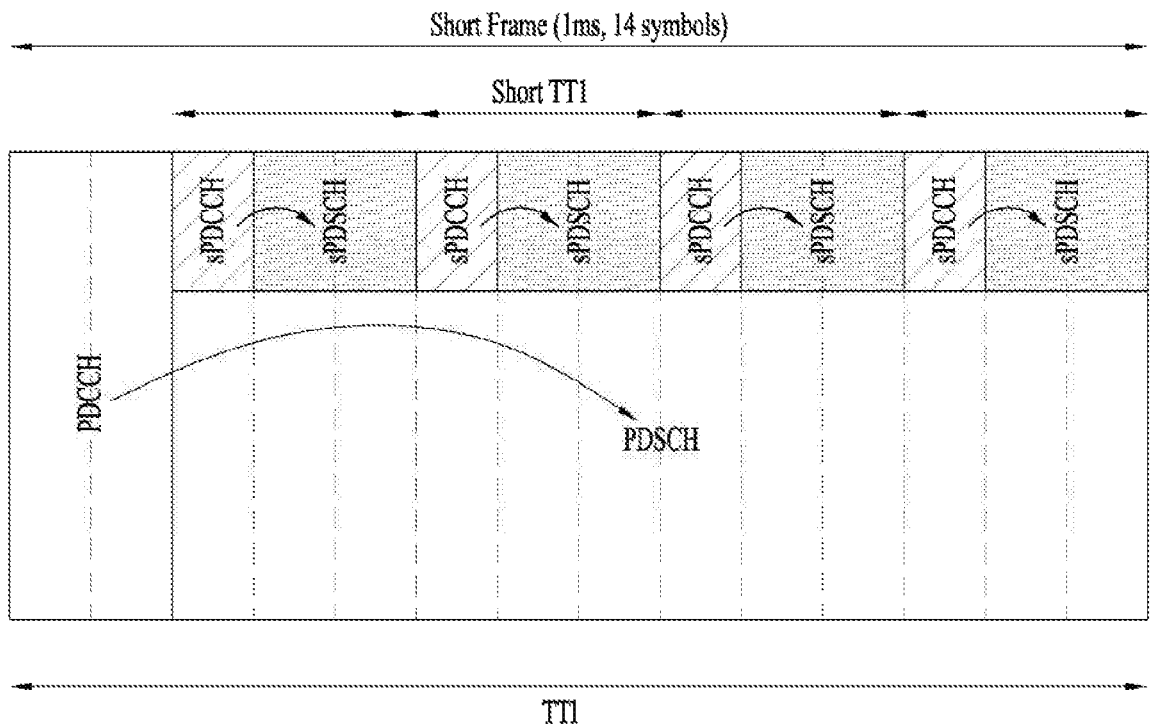
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

<OFDM Numerology>

The new RAT system uses an OFDM transmission scheme or a similar transmission scheme. For example, the new RAT system may follow the OFDM parameters defined in the following table. Alternatively, the new RAT system may conform to numerology of legacy LTE/LTE-A but include a broader system bandwidth (e.g., 100 MHz). Alternatively, one cell may support a plurality of numerologies. That is, UEs operating with different numerologies may coexist in one cell.

TABLE 2

| Parameter | Value |
| --- | --- |
| Subcarrier-spacing (Δf) | 75 kHz |
| OFDM symbol length | 13.33 us |
| Cyclic Prefix (CP) length | 1.04 us/0.94 us |
| System BW | 100 MHz |
| No. of available subcarriers | 1200 |
| Subframe length | 0.2 ms |
| Number of OFDM symbols per subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ, (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
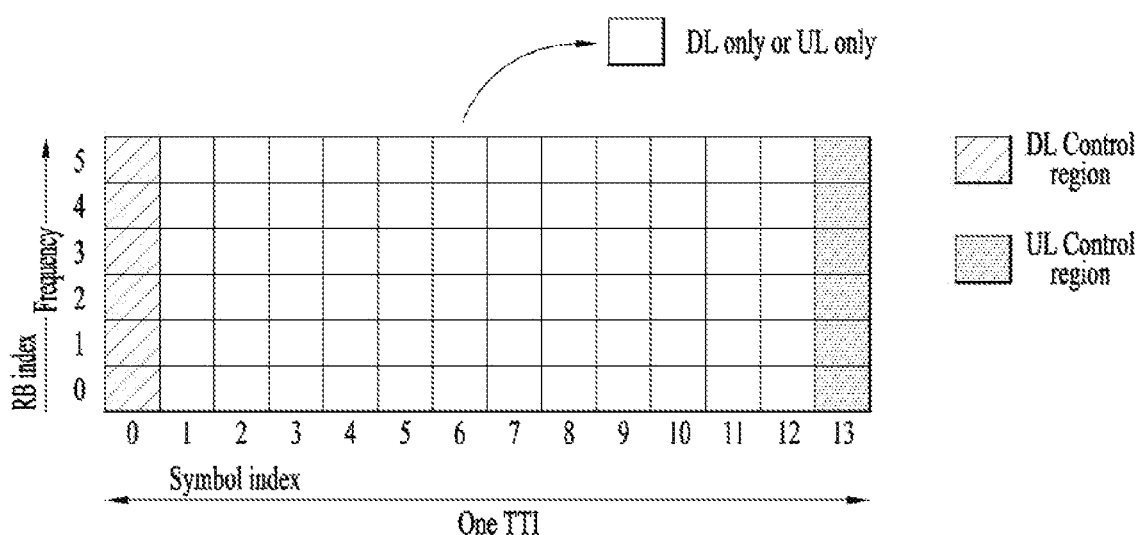
FIG. 6 illustrates a subframe structure.

FIG. 6 illustrates a subframe structure in a new radio access technology (NR).

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
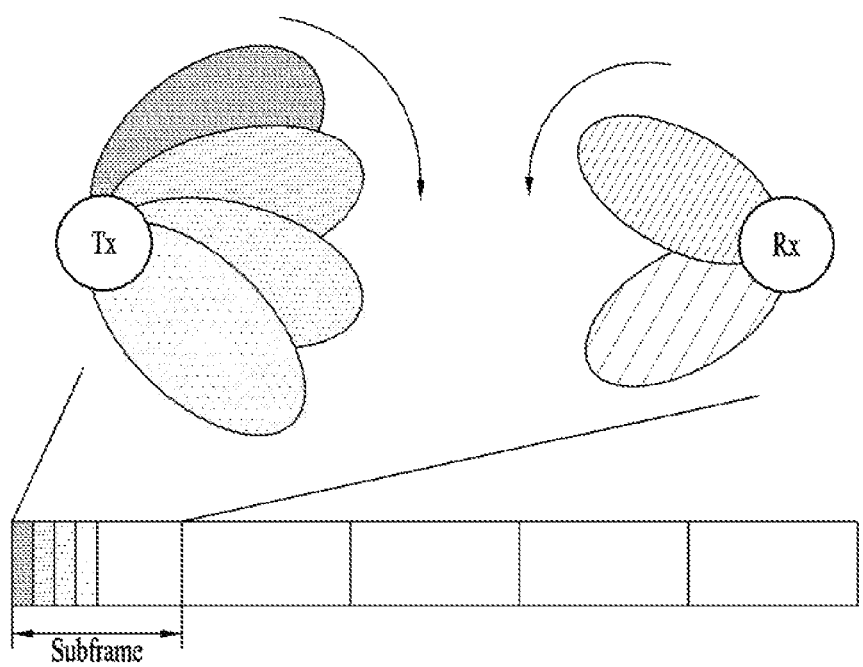
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception (Tx/Rx) analog beam scanning.

Referring to FIG. 7, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

In the present invention, a channel over which DL physical control information is transmitted is referred to as a PDCCH, for convenience of description. As illustrated in FIG. 6, the PDCCH may be transmitted through some OFDM symbol(s) of a front part of a subframe. Although the number of OFDM symbols in which the PDCCH is transmitted may be fixed, the same may be semi-statically or dynamically changed. The present invention proposes methods in which the UE determines the number of OFDM symbols in which the PDCCH is transmitted. Particularly, the present invention proposes a method of informing the UE of the number and locations of OFDM symbols in which the PDCCH is transmitted to the UE in a new RAT environment and a method in which the UE determines the number of locations of OFDM symbols in which the PDCCH is transmitted.

<Section A. PCFICH Transmission>

A PCFICH, which is a channel for indicating the number of OFDM symbols in which the PDCCH is transmitted, may be introduced in the new RAT (NR) environment. In the NR environment, the channel indicating OFDM symbols used for transmission of PDCCH(s) may have the same channel structure as the PDCCH or a different channel structure from the PDCCH. The UE may determine, through the PCFICH, the locations of OFDM symbols in which the PDCCH is transmitted. If data transmission occurs after PDCCH transmission (particularly, if numerologies of data and control information differ), the OFDM symbol locations at which the PDCCH is transmitted may be associated with a data start location. Alternatively, if a network informs the UE of the data start location, the UE may assume that symbols before the data start location are OFDM symbols in which the PDCCH is transmitted. Although the present invention proposes that the PCFICH be used to indicate the location(s) of OFDM symbol(s) in which the PDCCH is transmitted, the PCFICH may be used to transmit other additional information. For example, a data start point may be considered as the additional information. Information about the data start point may be applied to both a situation in which OFDM symbols to which the PDCCH is mapped overlap with an OFDM symbol in which data is started and a situation in which OFDM symbols to which the PDCCH is mapped do not overlap with an OFDM symbol in which data is started. As another example, the additional information may include information about a slot structure. Information as to whether a slot structure is a DL slot, a UL slot, a DL centric slot, a UL centric slot, or a reserved slot may be provided. The UE may assume that BD may not be performed or may be reduced in the UL, UL centric, or reserved slot.

If the PCFICH is transmitted in an NR environment operating based on analog beamforming (ABF), since even transmission itself of the PCFICH is influenced by ABF, only UEs present in a corresponding beam direction may determine the number of OFDM symbols available for PDCCH transmission. In this case, if the PCFICH is transmitted in the first OFDM symbol and a beam direction is differently configured in each DL control symbol, UEs to which a DL control signal is to be transmitted in the second symbol may not detect the PCFICH transmitted in the first symbol. Accordingly, in order to prevent this situation, the PCFICH may be transmitted with respect to each symbol available for PDCCH transmission or each analog beam.

The present invention assumes that the PDCCH is transmitted through a resource which is present within one OFDM symbol. That is, one PDCCH decoding candidate may be configured using a resource which is present within the same OFDM symbol. The present invention may also be applied even when one analog beam is applied to multiple symbols. The PDCCH may be mapped to multiple symbols. For example, even when each analog beam is mapped to one symbol, one PDCCH may be transmitted in multiple symbols. Information about symbol(s) to which the analog beam is applied and/or symbol(s) to which the PDCCH is mapped may be semi-statically or dynamically configured for the UE. The information may be provided to the UE by the PCFICH and/or analog beam information.

—A.1. Symbol-Level PCFICH Transmission

In an OFDM symbol region available for PDCCH transmission, a PCFICH transmitted in each OFDM symbol may indicate whether a PDCCH is transmitted in a corresponding OFDM symbol. Herein, the OFDM symbol region available for PDCCH transmission may be, for example, a few front OFDM symbols in a subframe and the number of OFDM symbols may be 1) predefined by specification or 2) configured through system information (SI)/RRC message. Alternatively, the number of OFDM symbols may signaled to the UE through higher layer signaling. In this case, the UE may not expect that the PDCCH will be transmitted in a region other than the OFDM symbol region available for PDCCH transmission. The UE may attempt to detect the PCFICH in the OFDM symbol region available for PDCCH transmission.

>Method A-1. As the first method, the UE may attempt to detect the PCFICH in every OFDM symbol available for PDCCH transmission. If the PCFICH is detected, the UE may determine that the PDCCH is transmitted in a corresponding OFDM symbol and, if the PCFICH is not detected, the UE may determine that the PDCCH is not transmitted in a corresponding OFDM symbol. When the PCFICH is detected, the UE may attempt to blind-detect the PDCCH in a corresponding OFDM symbol and, when the PCFICH is not detected, the UE may not attempt to blind-detect the PDCCH in a corresponding OFDM symbol. Alternatively, in consideration of the case in which reliability of the PCFICH is not high, if the PCFICH is detected, the UE may not perform BD under the assumption that the PDCCH is not transmitted and, if the PCFICH is not detected, the UE may perform BD under the assumption that the PDCCH may be transmitted.

>Method A-2. As another method, the UE may receive the PCFICH in every OFDM symbol available for PDCCH transmission and the PCFICH may indicate 1-bit information. For example, if the PCFICH indicates the value of 1, the UE may determine that the PDCCH is transmitted in a corresponding OFDM symbol and, if the PCFICH indicates the value of 0, the UE may determine that the PDCCH is not transmitted in a corresponding OFDM symbol. In this case, the PCFICH should be transmitted even in an OFDM symbol in which the PDCCH is not transmitted. Therefore, if the PDCCH is not transmitted and a PDSCH is transmitted in an OFDM symbol in which the PCFICH is transmitted, the UE may assume that the PDSCH is transmitted after being rate-matched or punctured in a resource element (RE), a physical resource block (PRB), a resource element group (REG), or a control channel element (CCE) region in which the PCFICH is transmitted.

>Method A-3. Alternatively, in OFDM symbol region available for PDCCH transmission, the PCFICH transmitted in each OFDM symbol may indicate whether the PDCCH is transmitted in a corresponding OFDM symbol and the next OFDM symbol. In this case, the PCFICH transmitted in each OFDM symbol may indicate whether the PDCCH is transmitted in a corresponding OFDM symbol and the next OFDM symbol. If the UE receives an indication indicating that the PDCCH is not transmitted in a specific OFDM symbol, the UE may not monitor the PDCCH under the assumption that the PDCCH is not transmitted in subsequent OFDM symbols starting from the specific OFDM symbol. Such an indication may be the same as an indication indicating whether that OFDM symbol is the last OFDM symbol of the PDCCH region.

>Method A-4. A PCFICH transmitted in a part of the OFDM symbol region may indicate whether the PDCCH is transmitted in a corresponding OFDM symbol and the next OFDM symbol and a PCFICH transmitted in a part of the OFDM symbol region may indicate whether the PDCCH is transmitted in a corresponding OFDM symbol. For example, a PCFICH transmitted in an OFDM symbol region except for the last OFDM symbol in the OFDM symbol region available for PDCCH transmission may indicate whether the PDCCH is transmitted in the a corresponding OFDM symbol and the next OFDM symbol and a PCFICH transmitted in the last OFDM symbol in the OFDM symbol region available for PDCCH transmission may indicate whether the PDCCH is transmitted in a corresponding OFDM symbol. In this case, the UE may not monitor the PDCCH in an OFDM symbol indicating that the PDCCH is not transmitted thereon. However, even if the PDCCH is not transmitted in a specific OFDM symbol, since the PDCCH may be transmitted in the next OFDM symbol, it is necessary to discern whether the PDCCH is transmitted in all of the OFDM symbol region in which the PDCCH can be transmitted. Alternatively, if the UE receives an indication indicating that the PDCCH is not transmitted in a specific OFDM symbol, the UE may not monitor the PDCCH under the assumption that the PDCCH is not transmitted in subsequent OFDM symbols starting from the specific OFDM symbol.

Figure 8:
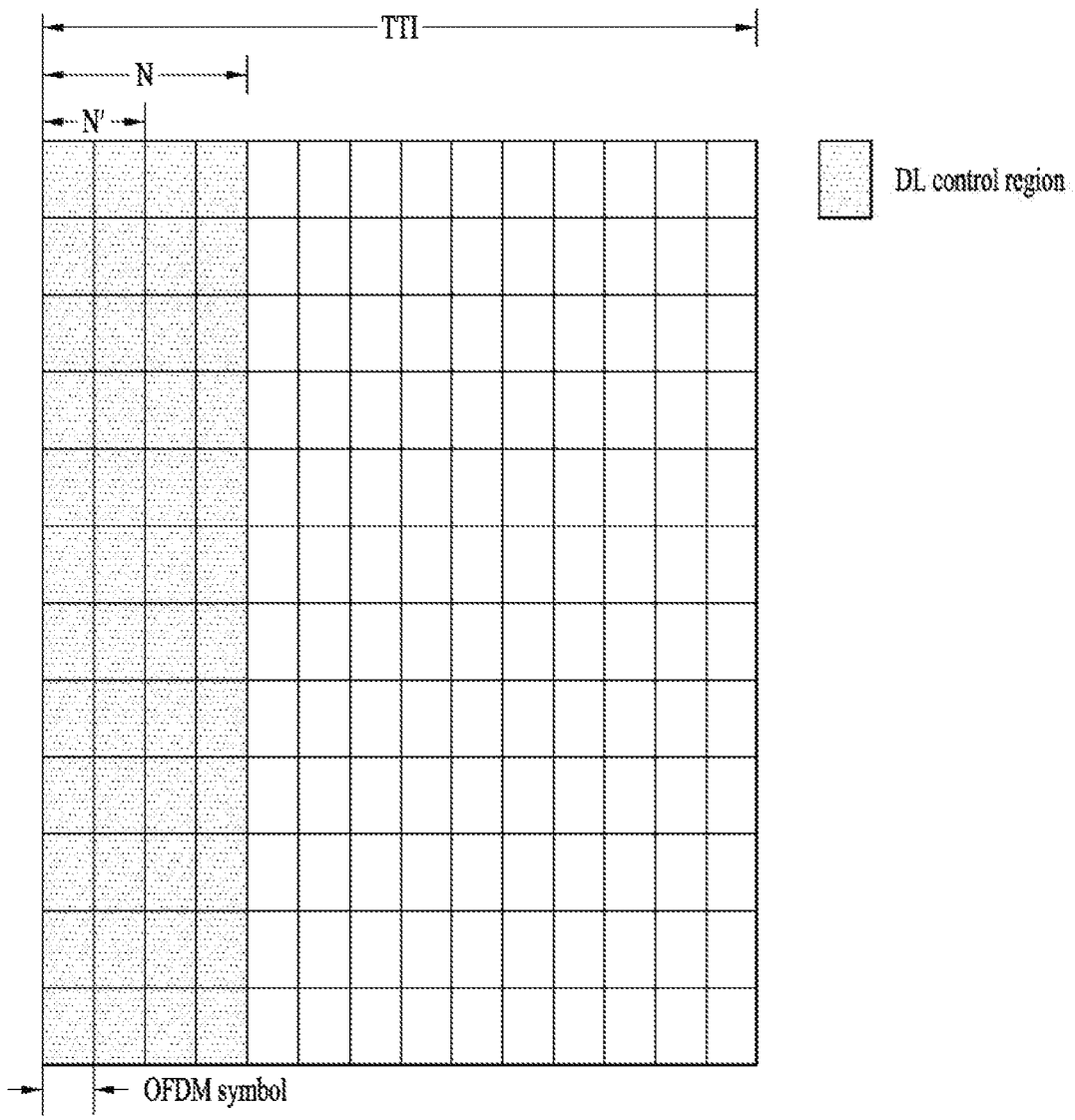
FIG. 8 is a diagram for explaining a transmission/reception method of a DL control channel according to the present invention.

—A.2. Number of Blind Detections (Number of Decoding Candidates) in Each OFDM Symbol FIG. 8 is a diagram for explaining a transmission/reception method of a DL control channel according to the present invention.

The number of decoding candidates present within each OFDM symbol may vary according to the number of OFDM symbols in which the PDCCH is transmitted. For example, if the maximum number of PDCCH decoding candidates that the UE can blind-detect is 16 and the number of OFDM symbols available for PDCCH transmission is 1, a maximum of 16 PDCCH decoding candidates may be present within one OFDM symbol. However, if the number of OFDM symbols available for PDCCH transmission is 2, fewer PDCCH decoding candidates than 16 candidates may be present within each OFDM symbol.

Thus, when the number of decoding candidates present within each OFDM symbol varies according to the number of OFDM symbols available for PDCCH transmission, signaling as to whether the PDCCH is transmitted in each OFDM symbol is problematic. For example, the UE may not attempt to receive the PDCCH until the UE determines the number of OFDM symbols in which the PDCCH is transmitted, or may not determine the number and locations of PDCCH decoding candidates because the UE is not aware of the number of OFDM symbols in which the PDCCH is transmitted.

To prevent this phenomenon, it is proposed that the number of PDCCH decoding candidates present within one OFDM symbol be equal regardless of the number of PDCCH transmission OFDM symbols. For example, if the maximum number of BDs for PDCCH that the UE can perform is X and the (maximum) number of OFDM symbols available for PDCCH transmission in a subframe is N, the number of BDs (i.e., the number of decoding candidates attempting to perform decoding) performed in each OFDM symbol should not exceed X/N or floor(X/N). For example, the UE may perform a maximum of floor(X/N) BDs, i.e., attempt to decode a maximum of floor(X/N) decoding candidates, in a subframe or in OFDM symbol #0 among OFDM symbols in a TTI. If the UE cannot detect the PCFICH in OFDM symbol #0, receives an indication indicating that the PDCCH is transmitted even in the next symbol, or should identify the next symbol by the PCFICH, the UE attempts to perform BD in the next OFDM symbol #2. In this way, the UE may attempt to perform decoding for reception/detection of the PDCCH in OFDM symbols until OFDM symbol # N−1. When the number of PDCCHs that the UE should read is determined in each slot (e.g., in a USS, a maximum of K PDCCHs is assumed), if the UE succeeds in detecting PDCCHs of a corresponding number, the UE may stop performing BD in the middle of detection. Alternatively, the UE may skip detection for symbol(s) indicated by the PCFICH as symbols in which the PDCCH is not present.

Meanwhile, in order to maximally use BD capabilities of the UE, the maximum number of BDs (i.e., the number of decoding candidates) in one OFDM symbol may vary according to the number of OFDM symbols in which the PDCCH is transmitted. For example, if an actual number of OFDM symbols in which the PDCCH is transmitted, known to the UE through reception of the PCFICH, is N' (where N'<=N), the maximum number of BDs (i.e., the number of PDCCH decoding candidates that the UE monitors) in each PDCCH transmission OFDM symbol may be equal to X/N'. In this case, if the maximum number of BDs for PDCCH that the UE can perform is X and the number of OFDM symbols available for PDCCH transmission in a subframe is N, the number of BDs (i.e., the number of decoding candidates) that the UE can perform in each OFDM symbol may be X/N (or floor(X/N)). However, the UE may be aware of the number and locations of OFDM symbols in which the PDCCH is transmitted through subsequent PCFICH detection. In this case, if an actual number of OFDM symbols in which the PDCCH is transmitted, known through reception of the PCFICH, is N' (where N'<=N), the remaining number of BDs may be additionally used to receive the PDCCH in OFDM symbol(s) in which the PDCCH is actually transmitted. For example, the remaining number of BDs may be X−(X/N)*N'. Therefore, the UE may perform X/N'−X/N additional BDs (i.e., monitoring of PDCCH decoding candidates) in each of N' OFDM symbols in which the PDCCH is actually transmitted. For example, the UE attempts to decode floor(X/N) decoding candidates in each OFDM symbol in a PDCCH control region until the UE identifies the actual number of OFDM symbols available for PDCCH transmission. Next, if the UE identifies the actual number N' of OFDM symbols available for PDCCH transmission, the UE may additionally perform {floor(X/N')−floor(X/N)} BDs in each of corresponding OFDM symbol(s) (e.g., OFDM symbol #0 to OFDM symbol #(N'−1)).

In addition, additional information for BD may be transmitted through the PCFICH. If the UE assumes that floor (X/N) BDs are performed in each symbol, a value indicating an increased degree or a decreased degree of N may be transmitted. That is, the value of N may be reconfigured. The changed value of N may be applied, starting from a symbol in which the PCFICH is transmitted, the next symbol, or the next slot. Alternatively, if the PCFICH indicates the number of symbols in which the PDCCH is transmitted, the UE performs floor(X/N) BDs in each symbol. However, if the number of actually used symbols is less than the maximum number N, the total number of BDs may be less than X.

—A.3. PCFICH Transmission Resource and Transmission Method

* PCFICH Transmission Resource

Figure 9:
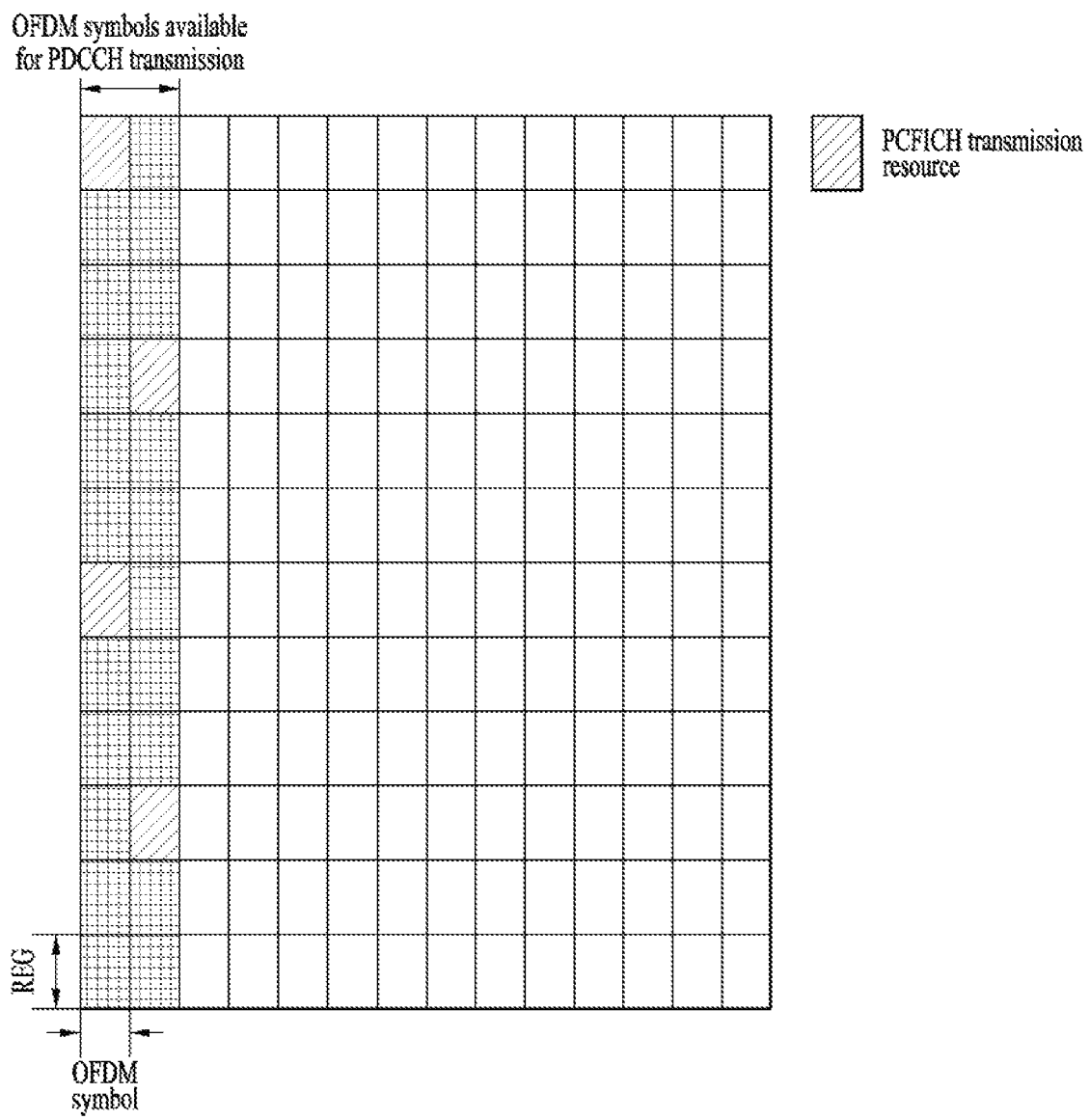
FIG. 9 is a diagram illustrating a PCFICH transmission/reception method according to the present invention.

FIG. 9 is a diagram illustrating a PCFICH transmission/reception method according to the present invention.

A resource on which the PCFICH is transmitted may be present in each OFDM symbol region available for PDCCH transmission in a subframe. As illustrated in FIG. 9, one specific or plural REs, PRBs, REGs, or CCEs in each OFDM symbol may be used to transmit the PCFICH.

The resource used for PCFICH transmission may be limited to some frequency resources in an entire system bandwidth. This is because it is desirable to transmit the PCFICH only in a partial band rather than an entire band upon taking into consideration the case in which applications (e.g., eMBB, mMTC, URLLC, etc.) having different numerologies are transmitted through frequency division multiplexing (FDM) in the same cell.

The resource used for PCFICH transmission (hereinafter, PCFICH resource) may be cell-specifically determined. Additionally, for an interference randomization effect, the location of the PCFICH resource may differ according to a cell ID and/or the location of the PCFICH resource may differ according to an OFDM symbol index in which the PCFICH is transmitted as illustrated in FIG. 9.

A plurality of candidate resources may be present for the PCFICH resources and the PCFICH may actually be transmitted through one of the candidate resources. In this case, the UE should blind-detect the PCFICH on a plurality of resources available for PCFICH transmission, i.e., PCFICH candidate resources.

* PCFICH Transmission Method

For PCFICH reception, the UE may perform channel estimation using a specific RS and demodulate the PCFICH. This specific RS may be an RS (e.g., CRS) which is always transmitted regardless of PCFICH transmission or may be an RS which is transmitted together with the PCFICH only when the PCFICH is transmitted. In the latter case, the PCFICH RS is not transmitted if the PCFICH is not transmitted.

Alternatively, the UE may attempt to detect the PCFICH (similar to detection of a PSS and/or an SSS) without an RS for demodulation. 1) In this case, the PCFICH has a specific sequence or value and the UE may determine specific information (e.g., information as to whether the PDCCH is transmitted in a PCFICH transmission OFDM symbol)) that the network desires to transmit through the PCFICH according to whether the PCFICH has been detected. 2) Alternatively, the PCFICH may have one sequence or value among M candidate sequences or candidate values and the UE may determine through which sequence/value the PCFICH has been transmitted. In this case, information of $\log_2 M$ bit(s) may be transmitted to the UE according to a sequence/value of the PCFICH. 3) Alternatively, the PCFICH may have a specific sequence/value and may be transmitted through one resource of different M candidate resources. An eNB may transmit the information of $\log_2 M$ bit(s) to the UE by transmitting the PCFICH on one resource of the M candidate resources. In this case, the UE may attempt to detect the PCFICH through candidate resource locations and acquire the information of $\log_2 M$ bit(s) according to a resource location at which the PCFICH is detected.

Alternatively, information transmitted through the PCFICH may be transmitted through an RS (e.g., a CRS, a DMRS, or a tracking RS) rather than an additional channel. Such an RS may be used for other purposes (e.g., radio resource measurement (RRM), channel estimation, or frequency tracking) in addition to information that the network desires to transmit through the above-mentioned PCFICH. To transmit such 1-bit or multi-bit information, a sequence of an RS or a scrambling sequence applied to the RS may differ according to the value of information that the network/eNB desires to transmit. Alternatively, a resource location at which the RS is transmitted may vary according to the value of the information that the network/eNB desires to transmit. Alternatively, the UE may determine specific information (e.g., information as to whether the PDCCH is transmitted in an RS transmission OFDM symbol) according to whether the RS is detected.

—A.4. PCFICH in Data Region

The PCFICH may also be transmitted even in OFDM symbol regions other than the OFDM symbol region in which the PDCCH is transmitted or in an OFDM symbol region in which data (e.g., PDSCH) is transmitted. This serves to cause the UE to determine an OFDM symbol region which is not used to transmit data or other channels rather than to cause the UE to monitor the PDCCH. For example, the eNB may inform, through the PCFICH, the UE of the location(s) of OFDM symbol(s) which are not used to receive data due to strong interference from an inter/intra cell. Alternatively, when data of an eMBB UE and data of a URLLC UE are transmitted through multiplexing in one cell, the eNB may inform, through the PCFICH, the eMBB UE of an OFDM symbol region that the eMBB UE should not use for data reception because control information and/or data is transmitted to the URLLC UE.

If the UE receives, through the PCFICH, an indication indicating that a specific OFDM symbol region is not used to transmit data or other channels, the UE may assume that data or other channels are transmitted through rate-matching or puncturing in a corresponding OFDM symbol region.

A PCFICH transmitted in a data region may have a transmission type and/or a transmission resource and a channel name different from a PCFICH transmitted in a PDCCH transmission region.

* PCFICH Transmission Method

The PCFICH in a data region may be transmitted in every OFDM symbol like the above-proposed symbol-level PCFICH. In this case, the PCFICH may indicate whether data is transmitted (or whether other channels are transmitted) in each OFDM symbol instead of indicating whether the PDCCH is transmitted in each OFDM symbol. Alternatively, the PCFICH in the data region may be transmitted in an OFDM symbol region which is determined once every plural OFDM symbols. In this case, the PCFICH may indicate 1) whether data is transmitted (or other channels are transmitted) in a corresponding OFDM symbol in which the PCFICH is transmitted or 2) whether data is transmitted (or other channels are transmitted) in a plurality of OFDM symbol regions including an OFDM symbol in which the PCFICH is transmitted. For example, when the PCFICH is transmitted in OFDM symbol #3, OFDM symbol #7, and OFDM symbol #10, the PCFICH of each OFDM symbol may indicate whether data is transmitted (or other channels are transmitted) in regions of OFDM symbols #3 to #6, OFDM symbols #7 to #9, and OFDM symbols #10 to #13.

Alternatively, upon considering a situation in which the UE transmits signals to other UEs using different analog beam directions at the location(s) of OFDM symbol(s) at which the UE assumes that data (or other channels) is not transmitted, the UE may always not detect the PCFICH at the location(s) of OFDM symbol(s) at which data (or other channels) is not transmitted. Accordingly, the PCFICH may indicate whether data is transmitted (or other channels are transmitted) in the next OFDM symbol of an OFDM symbol in which the PCFICH is transmitted, or 2) whether data is transmitted (or other channels are transmitted) in a plurality of OFDM symbol regions transmitted after the location(s) of OFDM symbol(s) at which the PCFICH is transmitted.

In this case, upon detecting the PCFICH, the UE may assume that data (or other channels) is transmitted at an OFDM symbol resource location associated with PCFICH transmission and, upon not detecting the PCFICH, the UE may assume that data (or other channels) is not transmitted at an OFDM symbol resource location associated with PCFICH transmission. In this case, the UE may assume that a PDSCH is transmitted through rate-matching or puncturing in an RE, PRB, REG, or CCE region in which the PCFICH is transmitted.

Conversely, upon not detecting the PCFICH, the UE may assume that data (or other channels) is transmitted at an OFDM symbol resource location associated with PCFICH transmission and, upon detecting the PCFICH, the UE may assume that data (or other channels) is not transmitted at an OFDM symbol resource location associated with PCFICH transmission.

Alternatively, the PCFICH may always be transmitted on a PCFICH transmission resource and may indicate 1-bit information. If the PCFICH indicates the value of 1, the UE may determine that data (or other channels) is transmitted in a corresponding OFDM symbol and, if the PCFICH indicates the value of 0, the UE may determine that data (or other channels) is not transmitted in a corresponding OFDM symbol. In this case, the UE may assume that the PDSCH is transmitted through rate-matching or puncturing in an RE, PRB, REG, or CCE region in which the PCFICH is transmitted.

* PCFICH Transmission Resource and Transmission Method

The transmission resource and the transmission method as proposed in Section A.3. PCFICH transmission resource and transmission method may be applied to a PCFICH transmitted even in OFDM symbol regions other than an OFDM symbol region in which the PDCCH is transmitted or even in an OFDM symbol region in which data (e.g., a PDSCH) is transmitted. However, such a PCFICH may be transmitted in OFDM symbol regions other than an OFDM symbol region in which the PDCCH is transmitted or may be transmitted in an OFDM symbol region in which data (e.g., a PDSCH) is transmitted. A transmission resource of a PCFICH transmitted in a data transmission region may be different from a transmission resource of a PCFICH transmitted in a PDCCH transmission region.

Meanwhile, the PCFICH may be transmitted within a subframe regardless of a PDCCH transmission region or a data transmission region. In this case, information as to whether each OFDM symbol is used to receive control and data channels may be transmitted by the PCFICH. For example, a PCFICH transmitted in a PDCCH transmission region may indicate whether the PDCCH is received in a corresponding OFDM symbol and/or in the next OFDM symbol and a PCFICH transmitted in a PDSCH transmission region may indicate whether the PDCCH is received in a corresponding OFDM symbol and/or the next OFDM symbol. In this case, a PCFICH transmitted in the last OFDM symbol region in which the PDCCH is transmitted may indicate whether the PDCCH is received in a corresponding OFDM symbol and/or whether the PDSCH is received in the next OFDM symbol.

<Section B. BD>

—PDCCH BD

An additional channel indicating the number of OFDM symbols in which the PDCCH is transmitted in a subframe may not be present and the UE may determine the number of OFDM symbols of the PDCCH through BD. That is, the UE may blind-detect the PDCCH with respect to the number of all possible PDCCH symbols or at location(s) of OFDM symbol(s) available for PDCCH transmission. However, since a transmission resource of the PDCCH and the number of decoding candidates may vary according to the number of PDCCH transmission OFDM symbols, there is a disadvantage of increasing the number of BDs of the UE.

Meanwhile, the UE may monitor the PDCCH within an OFDM symbol region available for PDCCH transmission without knowing the number of PDCCH transmission OFDM symbols. In this case, the OFDM symbol region available for PDCCH transmission may be, for example, a few front OFDM symbols in a subframe. The number of OFDM symbols may be 1) predefined in the specification or 2) configured through system information (SI) and/or an RRC message. Alternatively, the number of OFDM symbols may be a value transmitted through higher layer signaling. A plurality of resources to which the PDCCH may be mapped may be configured for the UE. If these resources to which the PDCCH may be mapped are a control resource set, multiple control resource sets may be configured for the UE and the number of OFDM symbols may differ according to each control resource set. A control resource set for a CSS may be different from a control resource set for a USS and the number of OFDM symbols used for the control resource set for the CSS may be different from the number of OFDM symbols used for the control resource set for the USS. In this case, the UE may not expect that the PDCCH will be transmitted in a region other than an OFDM symbol region available for PDCCH transmission. Therefore, the UE may not attempt to blind-detect the PDCCH in a region other than the OFDM symbol region available for PDCCH transmission.

To this end, such BD may be simpler when it is assumed that one PDCCH decoding candidate is configured using a resource present within the same OFDM symbol. This is because a resource constituting a decoding candidate may not be changed according to the number of PDCCH transmission OFDM symbols. In addition, such BD may be more proper when it is assumed that the number of PDCCH decoding candidates present within one OFDM symbol is the same regardless of the number of PDCCH transmission OFDM symbols. For example, if the maximum number of BDs for PDCCH that the UE can perform is X and the number of OFDM symbols available for PDCCH transmission in a subframe is N, the number of BDs (or the number of decoding candidates) performed in each OFDM symbol should not exceed X/N or floor(X/N).

—OFDM Symbol in which Data Transmission is Started

Upon receiving the PDCCH, although the UE may receive the PDCCH regardless of the number of PDCCH transmission OFDM symbols, the UE cannot be aware of the number of OFDM symbols in which the PDCCH is actually transmitted. Therefore, the UE may not determine the location(s) of OFDM symbol(s) at which PDSCH transmission and PUSCH transmission are started in the same subframe.

To solve this problem, the UE may assume that the maximum number (e.g. 2) of PDCCH symbols is always present and the PDSCH is transmitted starting from the next OFDM symbol. In addition, the UE may assume that the maximum number (e.g., 2) of PDCCH symbols is always present and the PUSCH is transmitted starting from the next OFDM symbol or is transmitted starting from the next OFDM symbol by leaving time (e.g., one OFDM symbol) necessary for DL to UL retuning after the maximum number (e.g., 2) of PDCCH symbols.

Alternatively, the eNB may indicate an OFDM symbol location (or the number of PDCCH transmission OFDM symbols) at which PDSCH transmission is started in a subframe through a DL grant scheduling the PDSCH. The eNB may also indicate an OFDM symbol location (or the number of PDCCH transmission OFDM symbols in a subframe in which the PUSCH is transmitted) at which PUSCH transmission is started in a subframe through a UL grant scheduling the PUSCH. More generally, the eNB may indicate a gap size (or a transmission timing) from an OFDM symbol in which the DL grant/UL grant is transmitted to an OFDM symbol in which transmission of a scheduled PDSCH/PUSCH is started.

Herein, the meaning of "the OFDM symbol location at which PDSCH transmission is started in a subframe" may indicate an OFDM symbol location at which PDSCH transmission is started in a subframe and/or the number of PDCCH transmission OFDM symbols in a subframe in which the DL grant is transmitted. In addition, the meaning of "an OFDM symbol location at which PUSCH transmission is started in a subframe" may indicate an OFDM symbol location at which PUSCH transmission in a subframe is started, the number of PDCCH transmission OFDM symbols in a subframe in which the UL grant is transmitted, and/or the number of PDCCH transmission OFDM symbols in a subframe in which the scheduled PUSCH is transmitted. When the number of PDCCH transmission OFDM symbols is indicated by the DL grant or the UL grant, the UE may monitor the PDCCH only in a corresponding PDCCH transmission OFDM symbol region and may not monitor the PDCCH in the other OFDM symbol regions. In the case of the PDSCH, the UE may perform operation by assuming that transmission is performed starting from an OFDM symbol immediately after a corresponding PDCCH transmission region and, in the case of the PUSCH, the UE may perform operation by assuming that transmission is performed starting from an OFDM symbol after a predetermined guard symbol duration from a corresponding PDCCH transmission region.

<Section C. SIB/RRC Indication>

—Configuration of Number of PDCCH OFDM Symbols by SIB/RRC

The number of OFDM symbols in which the PDCCH is transmitted in a subframe may be semi-statically configured by SI and/or an RRC signal. In this case, the UE may assume that the PDCCH is always transmitted in a region corresponding to the configured number of OFDM symbols. Then, the UE may not expect that the PDCCH will be transmitted in a region other than an OFDM symbol region available for PDCCH transmission. Therefore, the UE may not attempt to perform BD in the region other than the OFDM symbol region available for PDCCH transmission.

It may be assumed that one PDCCH decoding candidate is configured to use a resource present within the same OFDM symbol. This is because a resource constituting a decoding candidate may not be changed according to the number of PDCCH transmission OFDM symbols. In addition, this may be more proper when it is assumed that the number of PDCCH decoding candidates present within one OFDM symbol is the same regardless of the number of PDCCH transmission OFDM symbols. For example, if the maximum number of BDs for PDCCH that the UE can perform is X and the number of PDCCH transmission OFDM symbols configured by SI and/or an RRC signal is N, the number of BDs (or the number of decoding candidates) performed in each OFDM symbol should not exceed X/N or floor(X/N). In this case, the number of decoding candidates present within one OFDM symbol and a resource constituting a decoding candidate do not vary according to the number of PDCCH transmission OFDM symbols.

Additionally, the PDCCH may be transmitted only through a part of a subframe instead of always being transmitted in every subframe and the number of PDCCH OFDM symbols configured by the SI and/or the RRC signal may be assumed when the PDCCH is transmitted. The PDCCH may actually be transmitted through fewer OFDM symbols than the number of OFDM symbols configured by the SI or the RRC signal. However, the UE may assume that the PDCCH is transmitted thereto or to other UEs within the configured number of PDCCH transmission OFDM symbols. That is, upon receiving configuration indicating that the number of PDCCH transmission OFDM symbols is 2 through SIB/RRC signaling, the UE may determine a PDSCH/PUSCH transmission OFDM symbol region under the assumption that the PDCCH has been transmitted in two OFDM symbol regions even if the PDCCH is transmitted using only one OFDM symbol region in an actual specific subframe. Alternatively, for more efficient resource utilization, an OFDM symbol location (or the number of PDCCH transmission OFDM symbols) at which PDSCH transmission is started in a subframe may be indicated by a DL grant scheduling the PDSCH. In addition, an OFDM symbol location at which PUSCH transmission is started in a subframe (or the number of PDCCH transmission OFDM symbols in a subframe in which the PUSCH is transmitted) may be indicated by a UL grant scheduling the PUSCH. More generally, a gap size (or a transmission timing) from an OFDM symbol in which the DL grant and/or the UL grant is transmitted to an OFDM symbol in which scheduled PDSCH/PUSCH transmission is started may be indicated. The location(s) of OFDM symbol(s) at which scheduled PDSCH/PUSCH transmission is started may be present in a PDCCH OFDM symbol region configured by the SI or the RRC signal. That is, the location(s) of transmission start OFDM symbol(s) for the scheduled PDSCH/PUSCH may be indicated so that scheduled PDSCH/PUSCH transmission is started before the location(s) of the last OFDM symbol(s) available for PDCCH transmission. In this case, the UE may not monitor the PDCCH in an OFDM symbol region in which the scheduled PDSCH/PUSCH is transmitted and/or during a switching gap time from DL to UL needed to receive the scheduled PUSCH.

In this case, the OFDM symbol location at which PDSCH transmission is started in a subframe may indicate an OFDM symbol location at which PDSCH transmission is started in a subframe and/or the number of PDCCH transmission OFDM symbols in a subframe in which the DL grant is transmitted. In addition, the OFDM symbol location at which PUSCH transmission is started in a subframe may indicate an OFDM symbol location at which PUSCH transmission is started in a subframe, the number of PDCCH transmission OFDM symbols in a subframe in which the UL grant is transmitted, and/or the number of PDCCH transmission OFDM symbols in a subframe in which the scheduled PUSCH is transmitted. When the number of PDCCH transmission OFDM symbols is indicated by a DL grant or a UL grant, the UE may monitor the PDCCH only in a PDCCH transmission OFDM symbol region and may not monitor the PDCCH in the other OFDM symbol regions. In this case, the UE may perform operation by assuming that the PDSCH is transmitted starting from an OFDM symbol immediately after a corresponding PDCCH transmission region and the PUSCH is transmitted starting from an OFDM symbol after a predetermined guard symbol duration from a corresponding PDCCH transmission region.

—Number of PDCCH OFDM Symbols Before Initial Configuration is Received

When the number of OFDM symbols in which the PDCCH is transmitted is configured through the SI and/or the RRC signal, the UE cannot be aware of the number of PDCCH transmission OFDM symbols until the UE receives such configuration. However, even before the UE receives the SI or the RRC signal, the UE needs to receive the PDCCH in order to receive SI, a paging message, or an RRC message or to perform a PRACH procedure. In this case, the UE may receive the PDCCH through the following methods. If configuration of a control resource set that the UE should read includes configuration of a symbol to which the control resource set is mapped, the following method may be applied to the control resource set for first control (e.g., SI needed to read the remaining SI (e.g., the first SI)). Alternatively, when a duration of the control resource set is not configured, the following method may be applied. When an analog beam is used and multiple analog beams may be transmitted in one slot, the maximum number of beams that can be mapped to one slot may use a value determined in the standard specification at least before a higher layer is configured or assume to be equal to the maximum number (e.g., 2 or 4) of synchronization signal blocks that can be mapped to one slot. In addition, the maximum number of beams that can be mapped to one slot may differ according to a frequency range. For example, it may be assumed that, in a frequency range below 3 GHz, the maximum number of analog beams is 4 and the number of beams available for transmission in each slot is 1 or 2.

>Method C-1. The UE assumes that the PDCCH transmitted thereto is always transmitted in the first OFDM symbol regardless of the number of OFDM symbols in which the PDCCH is actually transmitted before the UE receives initial configuration for the number of PDCCH OFDM symbols. To this end, it may be assumed that one PDCCH decoding candidate is configured using a resource present within the same OFDM symbol. This is because a resource constitute a decoding candidate may not be changed according to the number of PDCCH transmission OFDM symbols. In addition, this may be more proper when it is assumed that the number of PDCCH decoding candidates present within one OFDM symbol is the same regardless of the number of PDCCH transmission OFDM symbols. For example, if the maximum number of BDs for PDCCH that the UE can perform is X and the number of OFDM symbols available for PDCCH transmission in a subframe is N, the number of BDs (or the number of decoding candidates) performed in each OFDM symbol should not exceed X/N or floor(X/N). In this case, the number of decoding candidates present within one OFDM symbol and the resource constituting the decoding candidate do not vary according to the number of PDCCH transmission OFDM symbols.

>Method C-2. BD

The UE may receive the PDCCH using the method as proposed in "Section B. BD" before the UE receives initial configuration of the number of PDCCH OFDM symbols.

—Data Transmission Start OFDM Symbol Before Initial Configuration is Received

Upon receiving the PDCCH before the UE receives initial configuration of the number of PDCCH OFDM symbols, the UE may receive the PDCCH regardless of the number of PDCCH transmission OFDM symbols. However, the UE may not be aware of the number of OFDM symbols in which the PDCCH is actually transmitted. Therefore, the UE may not determine the location(s) of OFDM symbol(s) at which PDSCH transmission and PUSCH transmission are started in the same subframe.

To solve this problem, the UE may assume that the maximum number (e.g. 2) of PDCCH symbols is always present and the PDSCH is transmitted starting from the next OFDM symbol. In addition, the UE may assume that the maximum number (e.g., 2) of PDCCH symbols is always present and the PUSCH is transmitted starting from the next OFDM symbol or is transmitted starting from the next OFDM symbol by leaving time (e.g., one OFDM symbol) necessary for DL to UL retuning after the maximum number (e.g., 2) of PDCCH symbols. Alternatively, it may be assumed that information about a data transmissions start OFDM symbol is transmitted through SI or a PBCH or data is started at a location at which a control region is ended or is always started in OFDM symbol 0.

Alternatively, the eNB may indicate an OFDM symbol location (or the number of PDCCH transmission OFDM symbols) at which PDSCH transmission is started in a subframe through a DL grant scheduling the PDSCH. The eNB may also indicate an OFDM symbol location (or the number of PDCCH transmission OFDM symbols in a subframe in which the PUSCH is transmitted) at which PUSCH transmission is started in a subframe through a UL grant scheduling the PUSCH. More generally, the eNB may indicate a gap size (or a transmission timing) from an OFDM symbol in which the DL grant/UL grant is transmitted to an OFDM symbol in which transmission of a scheduled PDSCH/PUSCH is started.

Herein, the meaning of "the OFDM symbol location at which PDSCH transmission is started in a subframe" may indicate an OFDM symbol location at which PDSCH transmission is started in a subframe and/or the number of PDCCH transmission OFDM symbols in a subframe in which the DL grant is transmitted. In addition, the meaning of "an OFDM symbol location at which PUSCH transmission is started in a subframe" may indicate an OFDM symbol location at which PUSCH transmission is started in a subframe, the number of PDCCH transmission OFDM symbols in a subframe in which the UL grant is transmitted, and/or the number of PDCCH transmission OFDM symbols in a subframe in which the scheduled PUSCH is transmitted. When the number of PDCCH transmission OFDM symbols is indicated by the DL grant or the UL grant, the UE may monitor the PDCCH only in a corresponding PDCCH transmission OFDM symbol region and may not monitor the PDCCH in the other OFDM symbol regions. In the case of the PDSCH, the UE may perform operation by assuming that transmission is performed starting from an OFDM symbol immediately after a corresponding PDCCH transmission region and, in the case of the PUSCH, the UE may perform operation by assuming that transmission is performed starting from an OFDM symbol after a predetermined guard symbol duration from a corresponding PDCCH transmission region.

<Section D. Implicit Configuration>

Figure 10:
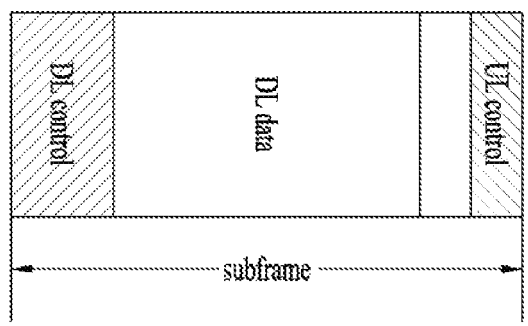
FIG. 10 illustrates subframe types according to the present invention.
Figure 10:
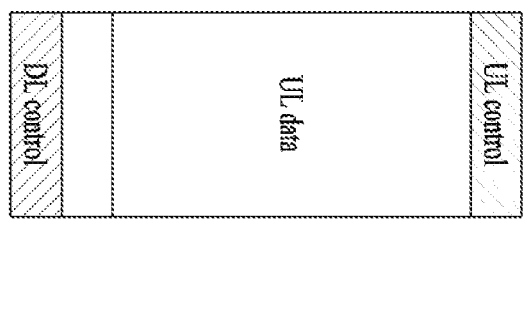
Figure 10:
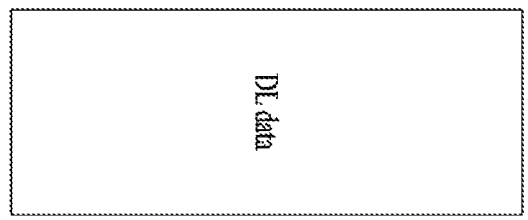
Figure 10:
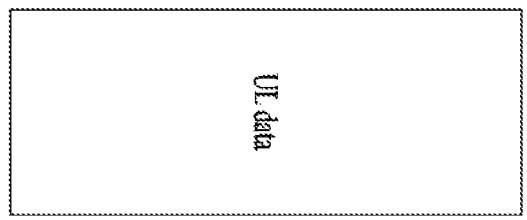
Figure 10:
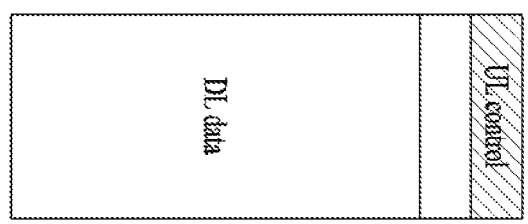
Figure 10:
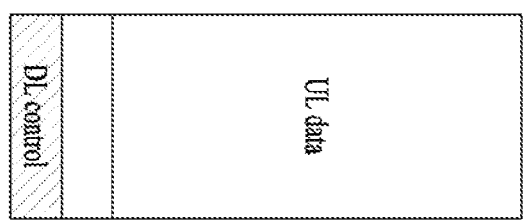

FIG. 10 illustrates subframe types according to the present invention.

In an NR environment, there are various subframe types according to a transmission location of a DL control channel, a UL control channel, a DL data channel, or a UL data channel constituting one subframe and the amount of transmission resources. For example, as illustrated in FIG. 10, one subframe in the NR environment may include various types according to whether a DL/UL control channel or a DL/UL data channel is present. Obviously, a subframe may have a part of subframe types illustrated in FIG. 10 or have other subframe types.

In this case, the number of OFDM symbols in which the PDCCH is transmitted may differ according to subframe type. The number of OFDM symbols in which the PDCCH is transmitted may include 0.

>Method D-1

For example, when various subframe types are present, the number of PDCCH OFDM symbols may be determined based on a corresponding subframe type. In this case, if the UE is aware of a subframe type (or a subframe type index) in a specific subframe, the UE may determine the number of PDCCH OFDM symbols in the specific subframe. As mentioned above, a subframe or a slot type may be transmitted through the PCFICH.

>Method D-2

Alternatively, the number of PDCCH transmission OFDM symbol may differ according to whether a subframe type is a subframe in which DL data is transmitted or a subframe in which UL data is transmitted. For example, when the DL data is transmitted in a subframe in which a DL grant is transmitted and the UL data is transmitted after a subframe in which a UL grant is transmitted, both the DL grant and the UL grant may be transmitted in the subframe in which the DL data is transmitted and only the UL grant may be transmitted in the subframe in which the UL data is transmitted. In this case, the subframe in which the DL data is transmitted and the DL grant and the UL grant can be transmitted may include more PDCCH OFDM symbols (e.g., two OFDM symbols) and the subframe in which the UL data is transmitted and only the UL grant can be transmitted may include fewer PDCCH OFDM symbols (e.g., one OFDM symbol). Accordingly, the number of PDCCH OFDM symbols may differ according to whether a subframe type is a subframe in which the DL data is transmitted or a subframe in which the UL data is transmitted. If the UE is aware of a data type (DL data or UL data) transmitted in a specific subframe, the UE may determine the number of OFDM symbols in which the PDCCH is transmitted. For example, it may be assumed that the number of PDCCH OFDM symbols is 2 in a subframe in which DL data can be transmitted and the number of PDCCH OFDM symbols is 1 in a subframe in which the UL data can be transmitted. This method may be more proper particularly when a subframe type (in terms of the UE) always includes the DL control channel (e.g., PDCCH) and the DL data channel (e.g., PDSCH) or includes the DL control channel and the UL data channel.

>Method D-3

Alternatively, the number of PDCCH transmission OFDM symbol may differ according to whether a subframe type is a subframe in which DL control channel (e.g., PDCCH) and DL data (e.g., PDSCH) are transmitted, a subframe in which the DL control channel and UL data are transmitted, or a subframe in which the DL or UL data is transmitted without the DL control channel (e.g., PDCCH). For example, the subframe in which the DL data is transmitted may include more PDCCH OFDM symbols (e.g., two OFDM symbols) and the subframe in which the UL data is transmitted may include fewer PDCCH OFDM symbols (e.g., one OFDM symbol). In addition, a PDCCH OFDM symbol may be not present in a subframe in which the DL or UL data is transmitted without the DL control channel (PDCCH). Therefore, the number of PDCCH OFDM symbols may differ according to whether a subframe is a subframe in which the DL control channel and the DL data can be transmitted, a subframe in which the DL control channel and the UL data can be transmitted, or a subframe in which the data channel is transmitted without the DL control channel.

>Method D-4

In consideration of the case in which the UE is not aware of a subframe type for every subframe, it is proposed that the number of specific PDCCH OFDM symbols be assumed in a specific case. For example, the UE may assume that the number of PDCCH OFDM symbols is a specific number (e.g., 1) in a subframe in which the UL data is transmitted thereto. Alternatively, when data is transmitted to the UE through multiple subframes (e.g., through TTI extension or TTI bundling), the UE may assume that the number of PDCCH OFDM symbols in the corresponding subframes is 0. In this case, when a PDSCH is scheduled in multiple subframes, it may be assumed that the number of PDCCH OFDM symbols in subframes except for the first subframe in which a PDCCH for scheduling the PDSCH is present among the multiple subframes (e.g., through TTI extension or TTI bundling) is 0. For example, when the PDSCH is transmitted in multiple TTIs, if there is a TTI in which the PDCCH for scheduling the PDSCH is present among the multiple TTIs, a DL control region may not be configured in the remaining TTIs except for the TTI in which the PDCCH is present. Alternatively, when the PDSCH is repeatedly transmitted in each of multiple TTIs, if the multiple TTIs include a TTI in which a PDCCH scheduling repeated transmission of the PDSCH is present, the DL control region may not be configured in TTIs except for the TTI in which the PDCCH is present. Even when the PDSCH is scheduled in multiple subframes, since UL scheduling may be continuously performed, a UL grant may be continuously blind-detected. A control monitoring period may be separately configured with respect to the UL grant and the DL grant.

As another method, the UE may determine the subframe type by determining the number of PDCCH OFDM symbols in an opposite way to the method in which the UE determines the number of PDCCH OFDM symbols according to subframe type. For example, if the PDCCH is configured by two OFDM symbols, the UE may determine that a corresponding subframe is a subframe type in which the DL data is transmitted and, if the PDCCH is configured by one OFDM symbol, the UE may determine that a corresponding subframe is a subframe type in which the UL data is transmitted.

Figure 11:
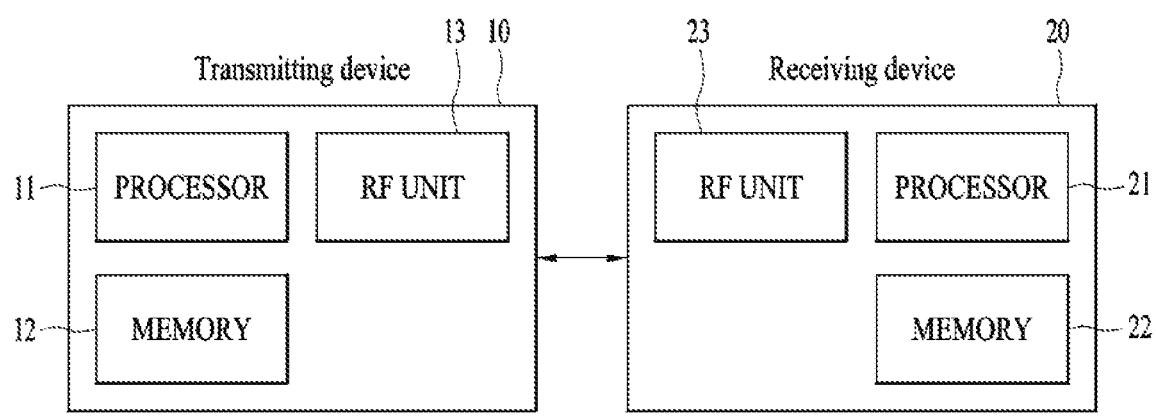
FIG. 11 is a block diagram illustrating elements of a transmitting device 10 and a receiving device 20 for implementing the present invention.

FIG. 11 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor according to the present invention may control the eNB RF unit to transmit DL control information according to any one of Section A, Section B, Section C, and Section D of the present invention or a combination of two or more thereof. The eNB processor may configure PDCCH decoding candidates according to Section A or Section C. The eNB processor may control the eNB RF unit to transmit a PDCCH carrying the DL control information in one of the PDCCH decoding candidates. The eNB processor may control the eNB RF unit to transmit a PCFICH according to Section A. The eNB processor may control the eNB RF unit to transmit information indicating the number of OFDM symbols available for PDCCH transmission through an SIB and/or an RRC signal according to Section C. The eNB processor may control the eNB RF unit to transmit implicit information indicating the number of OFDM symbols available for PDCCH transmission according to Section D.

The eNB processor may control the eNB RF unit to transmit DL data or receive UL data according to the DL control information.

The UE processor according to the present invention may control the UE RF unit to receive the DL control information according to any one of Section A, Section B, Section C, and Section D of the present invention or a combination of two or more thereof. The UE processor may attempt to detect the PDCCH carrying the DL control information by monitoring the PDCCH decoding candidates configured according to Section A or Section C. The UE processor may control the UE RF unit to receive the PCFICH according to Section A. The UE processor may control the UE RF unit to receive the information indicating the number of OFDM symbols available for PDCCH transmission through the SIB and/or the RRC signal according to Section C. The UE processor may control the UE RF unit to transmit the implicit information indicating the number of OFDM symbols available for PDCCH transmission according to Section D.

Upon detecting the PDCCH carrying the DL control information, the UE processor may control the UE RF unit to receive DL data or transmit UL data according to the DL control information.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

The invention claimed is:

1. A method of receiving a downlink (DL) signal by a user equipment, the method comprising:

detecting a physical downlink control channel (PDCCH) by attempting to decode decoding candidates within time symbols from time symbol #0 to time symbol # N−1 for DL control channel transmission in a time transmission interval (TTI); and receiving DL data based on DL control information carried by the PDCCH, wherein each of the time symbols #0 to # N−1 includes floor(X/N) decoding candidates, where N is a maximum number of symbols available for DL control channel transmission in the TTI and X is a maximum number of decoding candidates for each TTI.

2. The method of claim 1, wherein the DL control information includes information on a size from a time symbol in which the PDCCH is detected to a time symbol in which DL data transmission is started.

3. The method of claim 1, further comprising:
receiving information on N.

4. The method of claim 1, wherein N differs according to subframe type.

5. The method of claim 1, wherein the PDCCH is detected in time symbol # N'−1 at the latest, where N' is an actual number of time symbols used for DL control channel transmission in the TTI and is smaller than or equal to N.

6. The method of claim 5, further comprising:
receiving a physical control format indicator channel (PCFICH) including information on N',
wherein the PCFICH is received using one or more resource element groups (REGs) or one or more control channel elements (CCEs).

7. The method of claim 1, wherein the DL data is received in a plurality of TTIs and the number of symbols available for DL control channel transmission in each of the plural TTIs is 0.

8. A user equipment for receiving a downlink (DL) signal, the user equipment comprising,
a radio frequency (RF) unit, and
a processor configured to control the RF unit,
wherein the processor:
detects a physical downlink control channel (PDCCH) by attempting to decode decoding candidates within time symbols from time symbol #0 to time symbol # N−1 for DL control channel transmission in a time transmission interval (TTI); and
controls the RF unit to receive DL data based on DL control information carried by the PDCCH, and
wherein each of the time symbols #0 to # N−1 includes floor(X/N) decoding candidates, where N is a maximum number of symbols available for DL control channel transmission in the TTI and X is a maximum number of decoding candidates for each TTI.

9. The user equipment of claim 8, wherein the DL control information includes information on a size from a time symbol in which the PDCCH is detected to a time symbol in which DL data transmission is started.

10. The user equipment of claim 8, wherein the processor controls the RF unit to receive information on N.

11. The user equipment of claim 8, wherein the PDCCH is detected in time symbol # N'−1 at the latest, where N' is an actual number of time symbols used for DL control channel transmission in the TTI and is smaller than or equal to N.

12. The user equipment of claim 8, wherein the DL data is received in a plurality of TTIs and the number of symbols available for DL control channel transmission in each of the plural TTIs is 0.

13. A method of transmitting a downlink (DL) signal by a base station, the method comprising:
transmitting a physical downlink control channel (PDCCH) in one of decoding candidates included within time symbols from time symbol #0 to time symbol # N−1 for DL control channel transmission in a time transmission interval (TTI); and
transmitting DL data based on DL control information carried by the PDCCH,
wherein each of the time symbols #0 to # N−1 includes floor(X/N) decoding candidates, where N is a maximum number of symbols available for DL control channel transmission in the TTI and X is a maximum number of decoding candidates for each TTI.

14. The method of claim 13, wherein the DL control information includes information on a size from a time symbol in which the PDCCH is detected to a time symbol in which DL data transmission is started.

15. The method of claim 13, further comprising transmitting information on N.

16. The method of claim 13, wherein the PDCCH is transmitted in time symbol # N'−1 at the latest, where N' is an actual number of time symbols used for DL control channel transmission in the TTI and is smaller than or equal to N.

17. The method of claim 13, wherein the DL data is transmitted in a plurality of TTIs and the number of symbols available for DL control channel transmission in each of the plural TTIs is 0.

18. A base station for transmitting a downlink (DL) signal, the base station comprising,
a radio frequency (RF) unit, and
a processor configured to control the RF unit,
wherein the processor:
controls the RF unit to transmit a physical downlink control channel (PDCCH) in one of decoding candidates included within time symbols from time symbol #0 to time symbol # N−1 for DL control channel transmission in a time transmission interval (TTI); and
controls the RF unit to transmit DL data based on DL control information carried by the PDCCH, and
wherein each of the time symbols #0 to # N−1 includes floor(X/N) decoding candidates, where N is a maximum number of symbols available for DL control channel transmission in the TTI and X is a maximum number of decoding candidates for each TTI.

19. The base station of claim 18, wherein the DL control information includes information on a size from a time symbol in which the PDCCH is detected to a time symbol in which DL data transmission is started.

20. The base station of claim 18, wherein the processor controls the RF unit to transmit information on N.

* * * * *